US012607610B2

(12) United States Patent
Rowe

(10) Patent No.: US 12,607,610 B2
(45) Date of Patent: Apr. 21, 2026

(54) MONITORING THE EFFICIENCY OF CATALYTIC OXIDATION FOR ISOTOPIC DETECTION

(71) Applicant: Halliburton Energy Services, Inc., Houston, TX (US)

(72) Inventor: Mathew Dennis Rowe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 294 days.

(21) Appl. No.: 18/379,635

(22) Filed: Oct. 12, 2023

(65) Prior Publication Data

US 2025/0123249 A1     Apr. 17, 2025

(51) Int. Cl.
*G01N 30/72* (2006.01)
*B01D 53/86* (2006.01)
*G01N 30/02* (2006.01)

(52) U.S. Cl.
CPC ....... *G01N 30/7206* (2013.01); *B01D 53/864* (2013.01); *G01N 2030/025* (2013.01)

(58) Field of Classification Search
CPC ......... G01N 30/7206; G01N 2030/025; B01D 53/864
USPC ........................................ 73/23.37
See application file for complete search history.

(56) References Cited

U.S. PATENT DOCUMENTS

| | | | |
|---|---|---|---|
| 11,307,182 B2 | 4/2022 | Leigh et al. | |
| 2005/0266580 A1 | 12/2005 | Italiano et al. | |
| 2014/0216011 A1 | 8/2014 | Muthaiah et al. | |
| 2016/0223499 A1 | 8/2016 | Coleman et al. | |
| 2019/0380810 A1 | 12/2019 | Italiano | |
| 2021/0255153 A1 | 8/2021 | Leigh et al. | |
| 2025/0116648 A1* | 4/2025 | Strapoc ................. | E21B 21/067 |

OTHER PUBLICATIONS

International Search Report and Written Opinion for PCT Application No. PCT/US2023/35456, mailed Jun. 25, 2024.

* cited by examiner

*Primary Examiner* — Peter J Macchiarolo
*Assistant Examiner* — John M Royston
(74) *Attorney, Agent, or Firm* — The Hilton Firm PLLC

(57)     ABSTRACT

Apparatus and methods for measuring the efficiency of a thermal catalytic combustion unit. An example method provides a thermal catalytic combustion unit, a drying unit fluidically connected to the thermal catalytic combustion unit and configured to be downstream of the thermal catalytic combustion unit, and a sensor fluidically connected to the thermal catalytic combustion unit and configured to be downstream of the thermal catalytic combustion unit. The method further includes flowing a formation fluid sample through the thermal catalytic combustion unit, flowing a formation fluid sample through the drying unit, and sensing the formation fluid sample with the sensor after the formation fluid sample has flowed through the thermal catalytic combustion unit. The sensing detects the presence of a hydrocarbon and/or carbon monoxide in the formation fluid sample.

20 Claims, 5 Drawing Sheets

MONITORING THE EFFICIENCY OF CATALYTIC OXIDATION FOR ISOTOPIC DETECTION

TECHNICAL FIELD

The present disclosure relates generally to wellbore operations, and more particularly, to monitoring the efficiency of a thermal catalytic combustion unit by measuring the presence of hydrocarbons and carbon monoxide when performing isotope ratio mass spectrometry on subterranean formation fluid samples.

BACKGROUND

For some wellbore operations, the hydrocarbons present in the reservoir may be analyzed in order to maximize recovery and minimize operational expenditures. For example, a formation fluid sample may be analyzed using gas chromatography and/or isotope ratio mass spectrometry. Generally, analyses may include collecting a sample of formation fluid for determination of its hydrocarbon content. An isotope ratio mass spectrometer may be used to measure the compositional components of the formation fluid sample. Prior to analysis by the isotope ratio mass spectrometer, a thermal catalytic combustion unit may be used to thermally degrade alkanes within the formation fluid sample into carbon dioxide. Failure of the thermal catalytic combustion unit can come unexpectedly. Should the thermal catalytic combustion unit fail, the analysis of the sample may be delayed and the thermal catalytic combustion unit may require repair or even replacement.

The analysis of formation fluid samples is an important part of a wellbore operation. The present invention provides improved apparatus and methods for monitoring the efficiency of a thermal catalytic combustion unit and preventing the failure of the thermal catalytic combustion unit during the analysis of a formation fluid sample.

BRIEF DESCRIPTION OF THE DRAWINGS

Illustrative examples of the present disclosure are described in detail below with reference to the attached drawing figures, which are incorporated by reference herein, and wherein.

Figure 1:
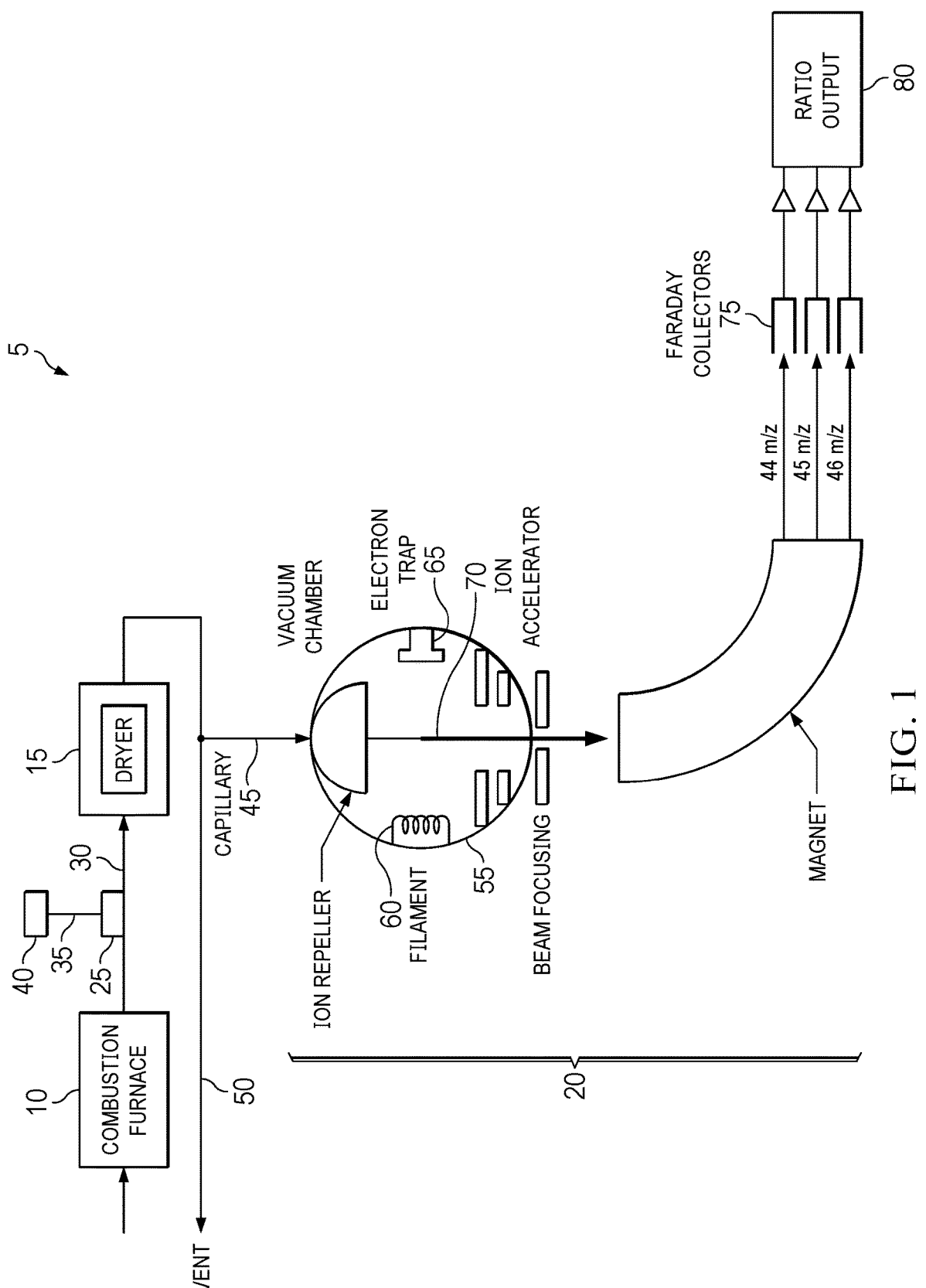
FIG. 1 is a schematic of an example thermal catalytic combustion unit and other associated system components in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to monitoring the efficiency of a thermal catalytic combustion unit by measuring the presence of hydrocarbons and carbon monoxide when performing isotope ratio mass spectrometry on subterranean formation samples.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms upstream and downstream may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

The present disclosure relates generally to wellbore operations, and more particularly, to monitoring the efficiency of a thermal catalytic combustion unit by measuring the presence of hydrocarbons and carbon monoxide when performing isotope ratio mass spectrometry on subterranean formation samples. Advantageously, a sensor may be placed after treatment by the thermal catalytic combustion unit at a location upstream of the isotope ratio mass spectrometer (IRMS) to measure the presence of hydrocarbons and carbon monoxide. In the thermal catalytic combustion unit, catalysts may be used to thermally degrade alkanes within the formation fluid sample to carbon dioxide. If hydrocarbons and/or carbon monoxide are detected after processing of the formation fluid sample in the thermal catalytic combustion unit, or the concentration of hydrocarbons and/or carbon monoxide begin to increase over time after processing of the formation fluid sample in the thermal catalytic combustion unit, this may be an indication that the thermal catalytic combustion unit is losing efficiency and beginning to fail. The sensor is configured to detect the presence of hydrocarbons and carbon monoxide. Data analysis software can measure trends in the concentrations of hydrocarbons and carbon monoxide over time. Should the concentration of hydrocarbons and/or carbon monoxide exceed various thresholds, the system can warn the operator and also take action to shut itself down and avoid further damage to the thermal catalytic combustion unit. As a further advantage, some optional examples comprise an additional sensor placed before the thermal catalytic combustion unit to measure the presence of carbon monoxide or carbon dioxide before treatment in the thermal catalytic combustion unit. The presence of carbon monoxide or carbon dioxide in the formation fluid sample before processing by the thermal catalytic combustion unit may be an indicator of a potential issue in the obtainment of or upstream processing of the formation fluid sample since the sample should primarily comprise alkanes before processing by the thermal catalytic combustion unit. This additional sensor may be used to predict disruption or failures upstream of the thermal catalytic combustion unit. As a further advantage, the measure of hydrocarbons and carbon monoxide can be normalized to the presence of carbon dioxide before and after processing by the thermal catalytic combustion unit so as to correlate irregularities in the concentrations of carbon monoxide and hydrocarbons during processing by the thermal catalytic combustion unit. As a further advantage, the presence of hydrocarbons and carbon monoxide surpassing a specific threshold can be detected in real time and a warning can notify the system operator immediately that the system should be taken offline for maintenance as soon as an opportunity is available. The system may be configured to continue tracking and quantifying the presence of hydrocarbons and carbon monoxide and then provide a second warning to act immediately should the presence of hydrocarbons and carbon monoxide pass a second threshold. Lastly, the system can be equipped with an immediate system shutoff should the presence of hydrocarbons and carbon monoxide exceed a third threshold. In some examples, the thermal catalytic combustion unit and isotopic ratio mass spectrometer may be subassemblies of a gas chromatograph-combustion-isotope ratio mass spectrometer (GC-C-IRMS) used for formation sample analysis.

As a general example, the IRMS may be utilized to analyze a formation fluid sample either on its own or after processing with a gas chromatographer. Prior to analysis by the IRMS, the formation fluid sample is flowed through a thermal catalytic combustion unit with catalysts to thermally degrade alkanes present in the formation fluid sample into carbon dioxide. The formation fluid sample may then be dried using one or more of a number of techniques (such as ion exchange membranes, cooler, etc.) to remove water. The sample may then be passed through an IRMS to perform analysis of the formation fluid sample. A sensor placed after the thermal catalytic combustion unit allows analysis of the output from the thermal catalytic combustion unit and may be analyzed to predict potential failures of the thermal catalytic combustion unit.

FIG. 1 is a schematic illustrating an example apparatus, generally 5, comprising a thermal catalytic combustion unit 10, a drying unit, 15, and IRMS 20. A formation fluid sample, which may be a processed and analyzed gas from a gas chromatography unit, is conveyed to a thermal catalytic combustion unit 10. The formation fluid sample, may also be a liquid in some examples. Within the thermal catalytic combustion unit 10, catalysts may be added to thermally degrade alkanes from the formation fluid sample and may convert liquid samples to simple gases. The thermal catalytic combustion unit 10 combusts the input fluid sample to provide a sample sufficient for later analysis with the IRMS 20. In the example of FIG. 1, a sensor 25 is connected to the conveyance line 30 connecting the thermal catalytic combustion unit 10 to the drying unit 15. The sensor 25 is any sensor sufficient for detecting the presence of hydrocarbons or carbon monoxide. The thermal catalytic combustion unit 10 is configured to convert the hydrocarbons (i.e., the alkanes) of the formation fluid sample into carbon dioxide. The residual presence of hydrocarbons or of carbon monoxide indicate that the thermal catalytic combustion unit 10 is not performing as desired. The sensor 25 may comprise an infrared sensor or a solid-state sensor. In some examples, the sensor 25 may also be configured to provide a measurement of the concentration or estimate of the concentration of the hydrocarbons and/or carbon monoxide. A data acquisition system, which is illustrated as a component of computer 40, is connected to the sensor 25 via data line 35. The data acquisition sensor intakes the data from the sensor 25 and converts it to a computer language that the computer 40 and any associated software can understand.

Should hydrocarbons and/or carbon monoxide be detected by sensor 25, the computer 40 connected to the sensor 25 may provide a warning to an operator. The warning may be an alert provided on the interface for the computer 40. Alternative warning systems may also be used, such as texts or other notifications provided to the mobile systems of select personnel. This warning can also provide instruction to take the thermal catalytic combustion unit 10 offline at the earliest opportunity for inspection and maintenance. The sensor 25 may continue to monitor the presence of hydrocarbons and/or carbon monoxide and should the presence persist or the concentration trend higher, a second warning may be issued which can notify the operator of the urgent need to take the thermal catalytic combustion unit 10 offline or risk damage to the thermal catalytic combustion unit 10 or downstream equipment. The sensor 25 may continue to monitor the presence of hydrocarbons and/or carbon monoxide and should the presence continue to persist or the concentration trend even higher, a third warning may be issued followed immediately by an automated system shutdown. The automated system shutdown may stop power to the thermal catalytic combustion unit 10 and/or close any valves necessary for the input of samples into the thermal catalytic combustion unit 10. The system shutdown may remain in place until acknowledged and/or bypassed by the operator.

After processing by the thermal catalytic combustion unit 10, the processed formation fluid sample proceeds to a drying unit 15 where water and moisture may be removed from the sample using any sufficient mechanism such as ion exchange membranes, cooler, etc. After removal of the water, the dried formation fluid sample proceeds to a capillary line 45 for entry into the IRMS 20. A vent line 50 branches off of the capillary line 45 and functions as a separate conduit for removal of excess sample volume. Within the IRMS 20, the processed sample enters an ion box 55 where the sample is exposed to electrons released from a heated filament 60. The electrons proceed to the electron trap and the voltage at the electron trap is measured. The ions from the processed formation fluid sample are emitted from the capillary 45 into the ion box 55 and flow perpendicularly relative to the electron beam. The ions are accelerated with an ion accelerator 70 and focused into a beam where they exit the ion box 55 and proceed to a series of Faraday collectors 75 where the ion ratio is then determined and output to a computer, such as computer 40 which may also be used for the detection and warning of hydrocarbons and/or carbon monoxide after processing of the formation fluid sample by the thermal catalytic combustion unit 10.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
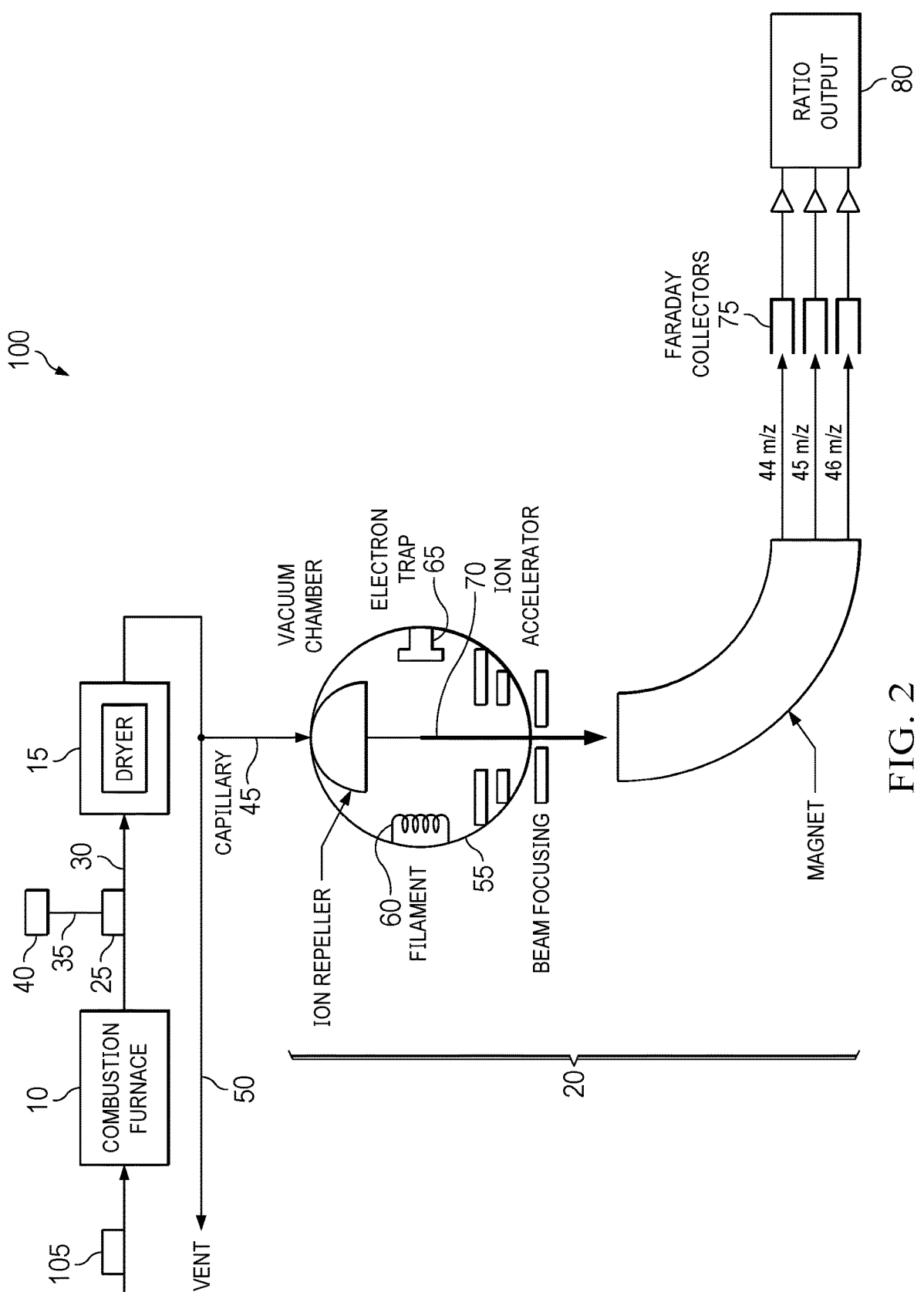
FIG. 2 is a schematic of another example thermal catalytic combustion unit and other associated system components in accordance with one or more examples described herein.

FIG. 2 is a schematic illustrating an example apparatus, generally 100, of a thermal catalytic combustion unit 10, a drying unit, 15, and IRMS 20. Apparatus 100 of FIG. 2 is similar to apparatus 5 of FIG. 1 except that a second sensor 105 is positioned on the sample input line 110 before the sample enters the thermal catalytic combustion unit 10. The presence of the second sensor 110 allows for the measurement of carbon monoxide and/or carbon dioxide before treatment by the thermal catalytic combustion unit 10. The addition of the second sensor 110 provides information of the sample composition prior to flow through the thermal catalytic combustion unit 10. Second sensor 110 may be used to help alert the operator of potential upstream issues. Carbon monoxide and carbon dioxide should not be present in the formation fluid sample prior to entry into the thermal catalytic combustion unit 10. The presence of these materials may indicate a problem with the processing equipment upstream, such as with the gas chromatography unit or the equipment used to obtain the formation fluid sample. This information from the second sensor 105 can also be sent to the computer 40 for analysis and compared with the information received from the first sensor 25 to provide an analysis of the components coming into and out of the thermal catalytic combustion unit 10. This correlated may be used by the operator to determine if there is an issue with the thermal catalytic combustion unit 10 or an upstream component. Further, the data obtained may be used to normalize the hydrocarbon and carbon monoxide content to that of carbon dioxide in order to determine the efficiency of the thermal catalytic combustion unit 10. Sensor 105 may be an infrared sensor or solid state sensor and is also connected to computer 40 similarly to sensor 25. Sensor 105 may be the same or a different type of sensor than sensor 25. After the formation fluid sample exits the thermal catalytic combustion unit 10, it may be transferred to the drying unit 15 and then the IRMS 20 for isotope ratio analysis as described above in the description of FIG. 1.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
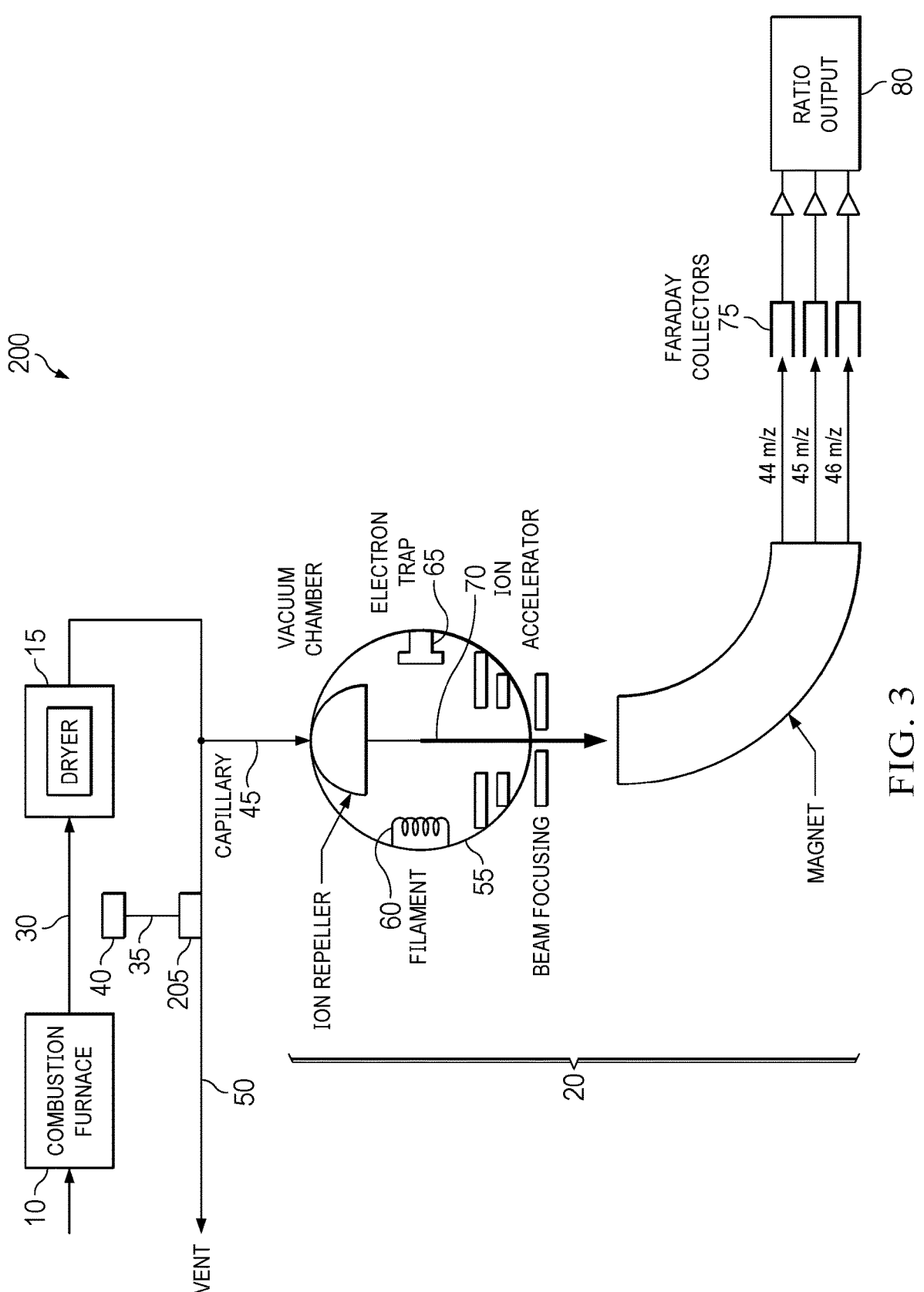
FIG. 3 is a schematic of another example thermal catalytic combustion unit and other associated system components in accordance with one or more examples described herein.

FIG. 3 is a schematic illustrating an example apparatus, generally 200, of a thermal catalytic combustion unit 10, a drying unit, 15, and IRMS 20. Apparatus 200 of FIG. 3 is similar to apparatus 5 of FIG. 1 except that sensor 205 replaces sensor 25. Sensor 205 is positioned on the vent line 50 that branches off of the capillary line 45. Sensor 205 functions identically to sensor 25 of FIG. 1. Sensor 205 may be an infrared or solid state sensor is connected to computer 40. Sensor 205 measures the presence of the formation fluid sample after it has been treated by the thermal catalytic combustion unit 10 as well as by the drying unit 15. The sensor 205 catches the vented sample that does not enter the capillary 45. As with sensor 25, the information obtained by sensor 205 is conveyed to computer 40 to be analyzed and, if necessary, to provide a warning to an operator.

Should hydrocarbons and/or carbon monoxide be detected by sensor 205, the computer 40 connected to the sensor 205 may provide a warning to an operator. The warning may be an alert provided on the interface for the computer 40. Alternative warning systems may also be used, such as texts or other notifications provided to the mobile systems of select personnel. This warning can also provide instruction to take the thermal catalytic combustion unit 10 offline at the earliest opportunity for inspection and maintenance. The sensor 205 may continue to monitor the presence of hydrocarbons and/or carbon monoxide and should the presence persist or the concentration trend higher, a second warning may be issued which can notify the operator of the urgent need to take the thermal catalytic combustion unit 10 offline or risk damage to the thermal catalytic combustion unit 10 or downstream equipment. The sensor 205 may continue to monitor the presence of hydrocarbons and/or carbon monoxide and should the presence continue to persist or the concentration trend even higher, a third warning may be issued followed immediately by an automated system shutdown. The automated system shutdown may stop power to the thermal catalytic combustion unit 10 and/or close any valves necessary for the input of samples into the thermal catalytic combustion unit 10. The system shutdown may remain in place until acknowledged and/or bypassed by the operator.

After the formation fluid sample exits the thermal catalytic combustion unit 10, it may be transferred to the drying unit 15 and then the IRMS 20 for isotope ratio analysis as described above in the description of FIG. 1.

It should be clearly understood that the example system illustrated by FIG. 3 is merely a general application of the principles of this disclosure in practice, and a wide variety of other examples are possible. Therefore, the scope of this disclosure is not limited in any manner to the details of FIG. 3 as described herein.

Figure 4:
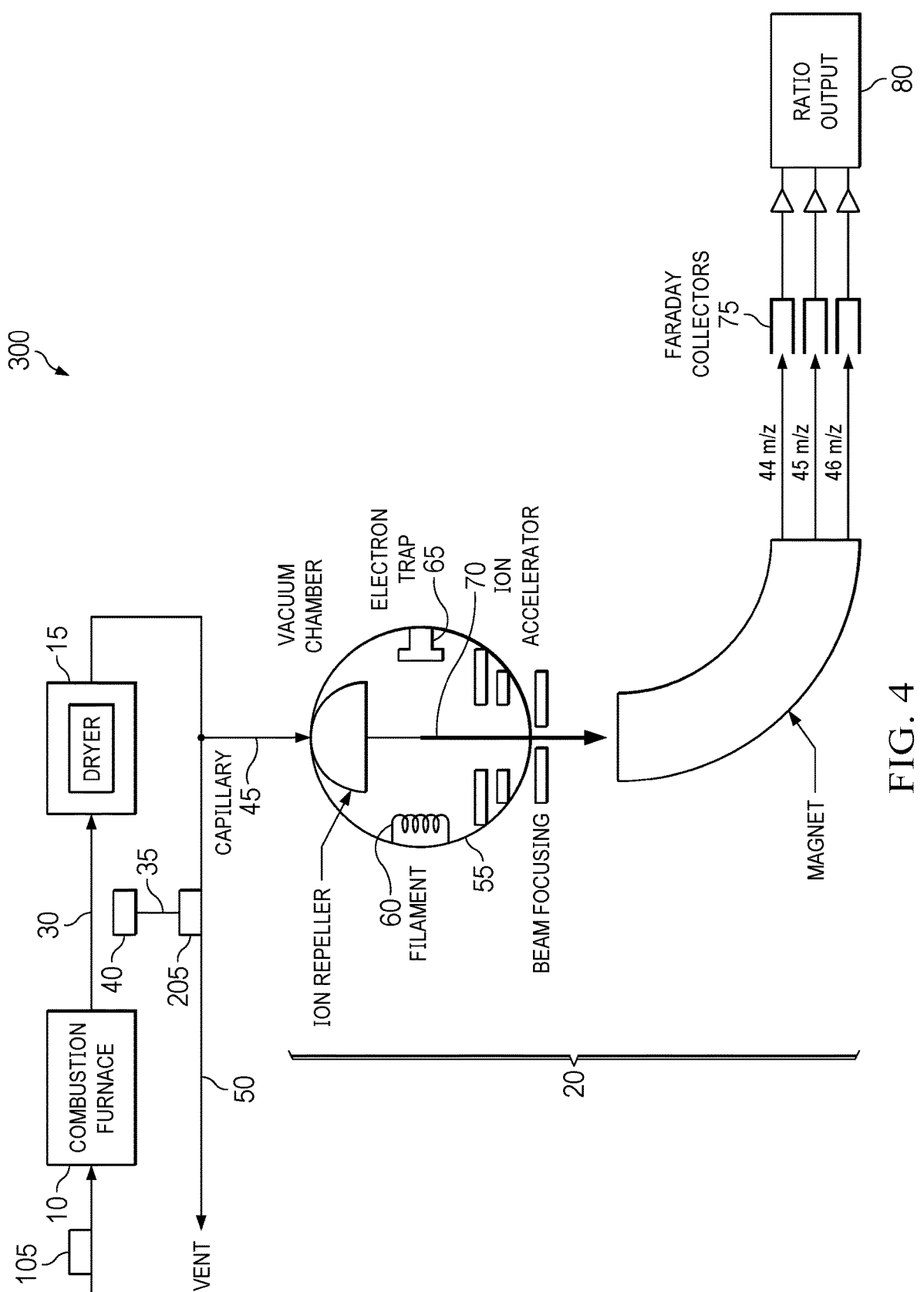
FIG. 4 is a schematic of another example thermal catalytic combustion unit and other associated system components in accordance with one or more examples described herein.

FIG. 4 is a schematic illustrating an example apparatus, generally 300, of a thermal catalytic combustion unit 10, a drying unit, 15, and IRMS 20. Apparatus 300 of FIG. 4 is similar to apparatus 200 of FIG. 3 except that apparatus 300 additionally contains second sensor 105 positioned on the sample input line 110 before the sample enters the thermal catalytic combustion unit 10. Second sensor 105 functions identically as described above in the description of FIG. 2.

Second sensor 105 may be used to measure carbon monoxide and/or carbon dioxide before treatment by the thermal catalytic combustion unit 10. The addition of the second sensor 110 provides information of the sample composition prior to treatment by the thermal catalytic combustion unit 10 which can help alert the operator of potential upstream issues. The information from the second sensor 105 can also be sent to the computer 40 for analysis and compared with the information received from the first sensor 205 to provide an analysis of the components coming into and out of the thermal catalytic combustion unit 10 which may be used by the operator to determine if there is an issue with the thermal catalytic combustion unit 10 or an upstream component. Further, the data obtained may be used to normalize the hydrocarbon and carbon monoxide content to that of carbon dioxide in order to determine the efficiency of the thermal catalytic combustion unit 10. Sensor 105 may be an infrared sensor or solid state sensor and is also connected to computer 40 similarly to sensor 205. Sensor 105 may be the same or a different type of sensor than sensor 205. After the formation fluid sample exits the thermal catalytic combustion unit 10, it may be transferred to the drying unit 15 and then the IRMS 20 for isotope ratio analysis as described above in the description of FIG. 1.

It should be clearly understood that the example system illustrated by FIG. 4 is merely a general application of the principles of this disclosure in practice, and a wide variety of other examples are possible. Therefore, the scope of this disclosure is not limited in any manner to the details of FIG. 4 as described herein.

Figure 5:
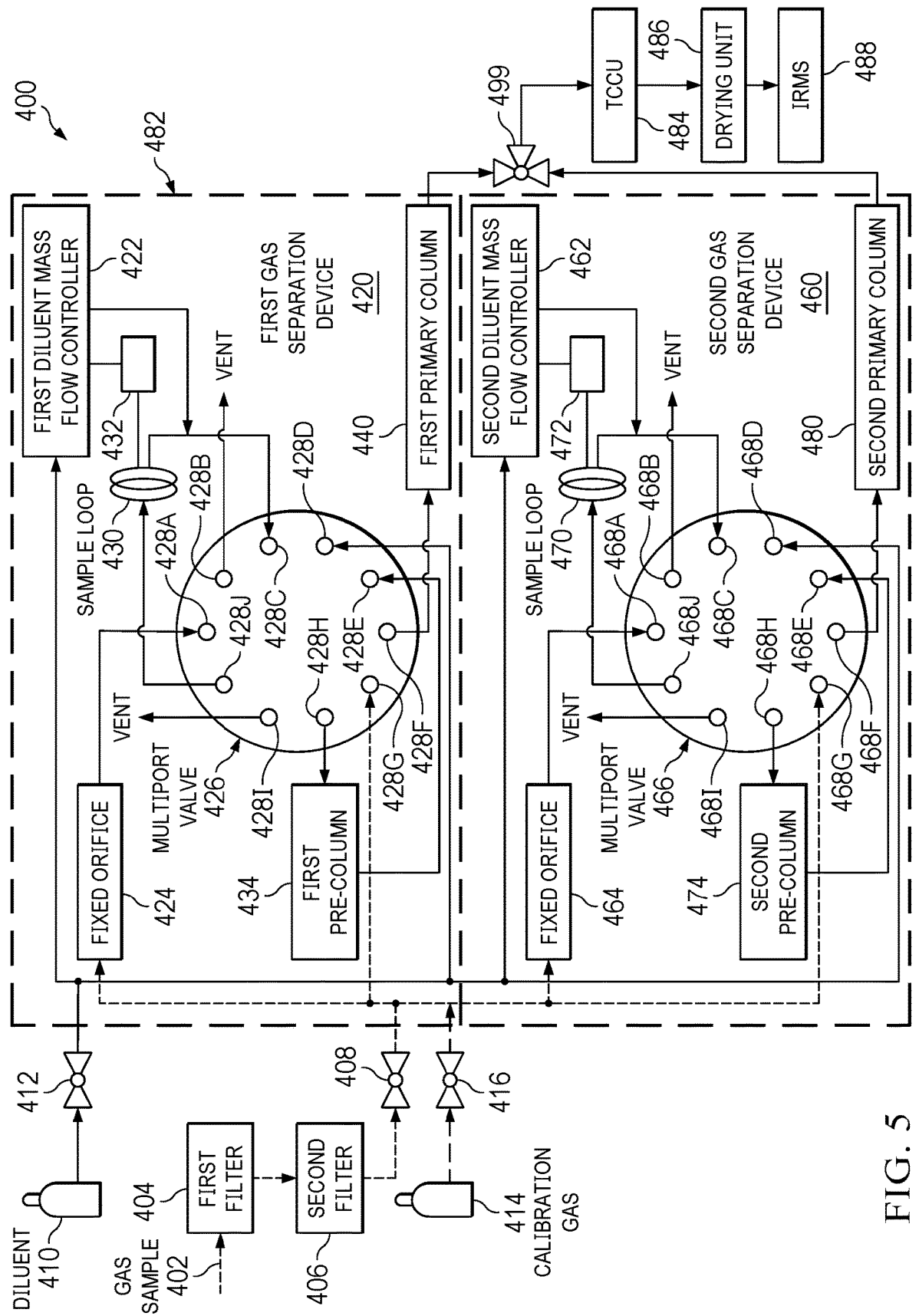
FIG. 5 is a schematic of a gas chromatography unit used in conjunction with a thermal catalytic combustion unit and other associated system components in accordance with one or more examples described herein.

FIG. 5 depicts an example system, generally 400, comprising a gas chromatography unit 482, a thermal catalytic combustion unit 484, a drying unit 486, and an isotope ratio mass spectrometer 488. The system 400 incorporates a gas chromatography unit 482 into the examples of FIGS. 1-4 described above, and utilizes the processed and analyzed gas produced from the gas chromatography unit 482 in the IRMS 488 after processing by the thermal catalytic combustion unit 484.

In the illustrated example, a formation fluid sample 402 (e.g., a gas obtained from within a wellbore) is provided for processing by the gas chromatography unit 482 having at least a first gas separation device 420 and a second gas separation device 460. The formation fluid sample 402 may be an active sample taken during a drilling or downhole process and may include fluid from the formation mixed in with drilling or processing fluid. The formation fluid sample 402 may have a number of chemical compounds comprising a number of hydrocarbons. At least a first and/or second hydrocarbon may be identified by an operator for analysis by the system 400.

In some examples, the formation fluid sample 402 may pass through a first filter 404, such as an $H_2S$ filter, to remove alkenes within the formation fluid sample 402. In some examples, the first filter 404 may use copper and potassium permanganate to remove the alkenes. Alkenes may cause issues with some gas chromatography instruments and therefore it may be beneficial to filter them from the formation fluid sample 402. The formation fluid sample 402 may pass through a second filter 406, such as an unsaturated hydrocarbons filter. The formation fluid sample 402 is now a filtered sample. The filtered formation fluid sample 402 may then pass through a first input valve 408 and may then be split into one or more individual gas separation devices such as the first gas separation device 420 and the second gas separation device 460 according to one or more hydrocarbons identified for analysis. A calibration gas 414 may also pass through a calibration valve 416. In some embodiments, the calibration gas 414 may be a carrier gas, and in some examples the calibration gas 414 may be combined with the filtered formation fluid sample 402 before passing into the first and second gas separation devices 420 and 460.

Each of the hydrocarbons identified in the formation fluid sample 402 for analysis may each have an identified concentration level or range for quantification. If the concentration level needs to be adjusted, a diluent 410 may need to be added. Previous gas separation and chromatography systems have generally introduced diluent directly before a gas chromatography column or on specific sample circuits after gas chromatography analysis. However, each hydrocarbon and chemical species needing to be analyzed from a formation sample may have different concentration levels and may need to be diluted individually. A diluent valve 412 directs the diluent 410 to the first and second gas separation devices 420 and 460 individually via an individual diluent mass flow controller coupled with each device. The first gas separation device 420 includes a first diluent mass flow controller 422. The second gas separation device 460 includes a second diluent mass flow controller 462.

The filtered formation fluid sample 402 is injected into the first gas separation device 420 through a first fixed orifice 424 and passes into a first multiport valve 426. The first multiport valve 426 may include a plurality of ports 428A through 428J, wherein each port is a one-way entry or exit port. The port 428A receives the formation fluid sample 402 from the first fixed orifice 424. The port 428J may direct the formation fluid sample 402 to pass through a first sample loop 430. The sample loop 430 may include one or more individual gas chromatography instruments for a specific and limited alkene separation. The sample loop 430 is coupled with a sample analysis processor 432, which determines the concentration range and determines whether or not dilution of the formation fluid sample 402 is needed in order for the concentration of the formation fluid sample 402 to be within an analyzable range. The sample analysis processor 432 may determine the concentration level based on an isotopic ratio (IR), a tunable diode laser (TDL) analyzer, or other non-destructive detectors used in gas sample analysis, or in some embodiments, from previous test results. If dilution is needed, a first amount of diluent 410 from the first diluent mass flow controller 422 is mixed with the formation fluid sample 402 and passes back into the multiport valve 426 through the port 428C. The diluted formation fluid sample 402 passes through the port 428H to a first pre-column 434 for processing of the diluted formation fluid sample 402. The first pre-column 434 may remove a portion of the formation fluid sample 402 and pass along analyte components for further processing through the port 428E. In some applications, the first pre-column 434 may direct the analytes to a first primary column 440 from the port 428F. The first pre-column 434 may also backflush part of the sample through the port 428D. The analyzed formation fluid sample 402 from the first pre-column 434 passes back into the multiport valve 426 through port 428E. The first primary column 440 separates the analytes or isomers of interest and returns the sample back to the multi-port valve 426. The ports 428B and 428I allow for venting of the sample and/or one of more of the gases therefrom. The port 428G may connect with calibration valve 416 for receiving receive a carrier or calibration gas. The formation fluid sample 402 may pass through several iterations of the sample loop 430, dilution, first pre-column 434 and primary column 440 before exiting the first separation device 420 for further gas chromatography processing.

The second gas separation device 460 is configured similarly to the first gas separation device 420. The filtered formation fluid sample 402 enters the second gas separation device 460 through a second fixed orifice 464 and passes into a second multiport valve 466. The second multiport valve 466 may include a plurality of ports 468A through 468J, wherein each port is a one-way entry or exit port. The port 468A receives the formation fluid sample 402 from the second fixed orifice 464. The port 468J may direct the sample to pass through a second sample loop 470. A sample analysis processor 472 may be communicatively coupled with the sample loop 470. The sample analysis processor 472 may determine a concentration range of the formation fluid sample 402 and determine whether or not dilution of the formation fluid sample 402 is needed.

In response to the sample analysis processor 472 determining that dilution may be needed to increase a concentration of the at least one hydrocarbon, the second diluent mass flow controller 462 may direct a second amount of diluent 110 to be mixed with the formation fluid sample 402 after the sample loop 470 and passes back into the multiport valve 466 through the port 468C. The port 468H is coupled with a second pre-column 474 for processing analytes from the diluted formation fluid sample 402, and as needed, backflush through the port 468D. The diluted formation fluid sample 402 passes back into the multiport valve 466 through port 468E from the second pre-column 474, and may then be directed to a second primary column 480 for separating analytes or isomers of interest from the diluted formation fluid sample 402. The formation fluid sample 402 may pass through several iterations of the sample loop 470, dilution, the second pre-column 474, and second primary column 480 before exiting second gas separation device 460 for further processing. The ports 468B and 468I allow for venting of the formation fluid sample 402 and/or one of more of the gases therefrom. The port 468G may connect with calibration valve 416 for receiving receive a carrier or calibration gas.

In some examples, the processed and analyzed formation fluid samples 402 may be sent for further processing analysis downstream of the gas chromatography unit 482. The processed formation fluid samples 402 may pass through a valve 499 and on to thermal catalytic combustion unit 484, then to the drying unit 486, and then to the isotope ratio mass spectrophotometer 488 to perform the analysis as discussed above. In the thermal catalytic combustion unit 484, catalysts may be added to thermally degrade the alkanes in the sample to carbon dioxide. As discussed above, a sensor is present in the system 400 downstream of the thermal catalytic combustion unit 484 and is located either immediately after the thermal catalytic combustion unit 484 but upstream of the drying unit 486, or downstream of the drying unit 486 on the vent line off of the capillary line used for the IRMS 488. Optionally, a sensor may also be placed upstream of the thermal catalytic combustion unit 484. As discussed above, the sensors detect the presence of hydrocarbons, carbon monoxide, and/or carbon dioxide and may be used to predict and prevent damage to the thermal catalytic combustion unit 484 through the detection of hydrocarbons and/or carbon monoxide in the formation fluid sample 402 after treatment with the thermal catalytic combustion unit 484.

The drying unit 186 may dry the formation fluid sample 402 to remove water or moisture from the formation fluid sample 402. The IRMS 488 may analyze the subset of the chemical species to measure an isotopic composition of the at least one first hydrocarbon and an isotopic composition of the at least second hydrocarbon from the formation fluid samples 402.

It should be clearly understood that the example system illustrated by FIG. 5 is merely a general application of the principles of this disclosure in practice, and a wide variety of other examples are possible. Therefore, the scope of this disclosure is not limited in any manner to the details of FIG. 5 as described herein.

The systems disclosed herein may directly or indirectly affect one or more components or pieces of equipment associated with or which may come into contact with the systems such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are apparatus in accordance with the disclosure and the illustrated FIGs. An example apparatus comprises a thermal catalytic combustion unit, a drying unit fluidically connected to the thermal catalytic combustion unit and configured to be downstream of the thermal catalytic combustion unit, and a sensor fluidically connected to the thermal catalytic combustion unit and configured to be downstream of the thermal catalytic combustion unit; wherein the sensor is configured to detect the presence of hydrocarbons and carbon monoxide in a fluid sample after the fluid sample was treated by the thermal catalytic combustion unit.

Additionally or alternatively, the apparatus may include one or more of the following features individually or in combination. The sensor may be located upstream of the drying unit. The sensor may be located downstream of the drying unit. The sensor may be an infrared sensor or a solid state sensor. The sensor may be a first sensor and a second sensor is disposed upstream of the thermal catalytic combustion unit. The first sensor may be located upstream of the drying unit. The first sensor may be located downstream of the drying unit. The second sensor may be the same type of sensor as the first sensor. The second sensor may be a different type of sensor than the first sensor. The apparatus may further comprise an isotope ratio mass spectrophotometer.

Provided are methods for measuring the efficiency of a thermal catalytic combustion unit in accordance with the disclosure and the illustrated FIGs. An example method comprises providing an apparatus comprising: a thermal catalytic combustion unit, a drying unit fluidically connected to the thermal catalytic combustion unit and configured to be downstream of the thermal catalytic combustion unit, and a sensor fluidically connected to the thermal catalytic combustion unit and configured to be downstream of the thermal catalytic combustion unit. The method further comprises flowing a formation fluid sample through the thermal catalytic combustion unit, flowing a formation fluid sample through the drying unit, and sensing the formation fluid sample with the sensor after the formation fluid sample has flowed through the thermal catalytic combustion unit; wherein the sensing comprises detecting the presence of a hydrocarbon and/or carbon monoxide in the formation fluid sample.

Additionally or alternatively, the method may include one or more of the following features individually or in combination. The method may further comprise flowing the formation fluid sample through an isotope ratio mass spectrometer after the formation fluid sample has flowed through the drying unit. The method may further comprise flowing the formation fluid sample through a gas chromatography unit before the formation fluid sample has flowed through the thermal catalytic combustion unit. The sensor may be located upstream of the drying unit. The sensor may be located downstream of the drying unit. The sensor may be an infrared sensor or a solid state sensor. The sensor may be a first sensor and a second sensor is disposed upstream of the thermal catalytic combustion unit. The first sensor may be located upstream of the drying unit. The first sensor may be located downstream of the drying unit. The second sensor may be the same type of sensor as the first sensor. The second sensor may be a different type of sensor than the first sensor. The apparatus may further comprise an isotope ratio mass spectrophotometer.

Provided are systems for measuring the efficiency of a thermal catalytic combustion unit in a wellbore in accordance with the disclosure and the illustrated FIGs. An example system comprises an apparatus comprising a thermal catalytic combustion unit, a drying unit fluidically connected to the thermal catalytic combustion unit and configured to be downstream of the thermal catalytic combustion unit, a sensor fluidically connected to the thermal catalytic combustion unit and configured to be downstream of the thermal catalytic combustion unit; wherein the sensor is configured to detect the presence of hydrocarbons and carbon monoxide in a formation fluid sample after the formation fluid sample was treated by the thermal catalytic combustion unit, and an isotope ratio mass spectrophotometer fluidically connected to the drying unit and located downstream of the drying unit. The system further comprises a gas chromatography unit fluidically connected to the thermal catalytic combustion unit and located upstream of the thermal catalytic combustion unit.

Additionally or alternatively, the system may include one or more of the following features individually or in combination. The gas chromatography unit may be configured to analyze the formation fluid sample to detect a hydrocarbon before the formation fluid sample is flowed to the thermal combustion unit. The isotope ratio mass spectrophotometer may be configured to analyze the formation fluid sample to detect an isotope after the formation fluid sample was flowed to the thermal combustion unit. The sensor may be located upstream of the drying unit. The sensor may be located downstream of the drying unit. The sensor may be an infrared sensor or a solid state sensor. The sensor may be a first sensor and a second sensor is disposed upstream of the thermal catalytic combustion unit. The first sensor may be located upstream of the drying unit. The first sensor may be located downstream of the drying unit. The second sensor may be the same type of sensor as the first sensor. The second sensor may be a different type of sensor than the first sensor. The apparatus may further comprise an isotope ratio mass spectrophotometer.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. An apparatus comprising:
   a thermal catalytic combustion unit,
   a drying unit fluidically connected to the thermal catalytic combustion unit and configured to be downstream of the thermal catalytic combustion unit, and a sensor fluidically connected to the thermal catalytic combustion unit and configured to be downstream of the thermal catalytic combustion unit; wherein the sensor is configured to detect the presence of hydrocarbons and carbon monoxide in a fluid sample after the fluid sample was treated by the thermal catalytic combustion unit; wherein the sensor is located downstream of the drying unit.

2. The apparatus of claim 1, wherein the sensor is an infrared sensor or a solid state sensor.

3. The apparatus of claim 1, wherein the sensor is a first sensor and a second sensor is disposed upstream of the thermal catalytic combustion unit.

4. The apparatus of claim 3, wherein the second sensor is a same type of sensor as the first sensor.

5. The apparatus of claim 3, wherein the second sensor is a different type of sensor than the first sensor.

6. The apparatus of claim 1, wherein the apparatus further comprises an isotope ratio mass spectrophotometer.

7. The apparatus of claim 1, wherein the thermal catalytic combustion unit is configured to use a catalyst to thermally degrade an alkane within a formation fluid sample to carbon dioxide.

8. A method for measuring the efficiency of a thermal catalytic combustion unit, the method comprises:

providing an apparatus comprising:

a thermal catalytic combustion unit, a drying unit fluidically connected to the thermal catalytic combustion unit and configured to be downstream of the thermal catalytic combustion unit, and a sensor fluidically connected to the thermal catalytic combustion unit and configured to be downstream of the thermal catalytic combustion unit and also downstream of the drying unit, flowing a formation fluid sample through the thermal catalytic combustion unit, flowing a formation fluid sample through the drying unit, and sensing the formation fluid sample with the sensor after the formation fluid sample has flowed through the thermal catalytic combustion unit; wherein the sensing comprises detecting the presence of a hydrocarbon and/or carbon monoxide in the formation fluid sample.

9. The method of claim 8, further comprising flowing the formation fluid sample through an isotope ratio mass spectrometer after the formation fluid sample has flowed through the drying unit.

10. The method of claim 8, further comprising flowing the formation fluid sample through a gas chromatography unit before the formation fluid sample has flowed through the thermal catalytic combustion unit.

11. The method of claim 8, wherein the sensor is an infrared sensor or a solid state sensor.

12. The method of claim 8, wherein the sensor is a first sensor and wherein a second sensor is disposed upstream of the thermal catalytic combustion unit.

13. The method of claim 8, wherein the thermal catalytic combustion unit is configured to use a catalyst to thermally degrade an alkane within a formation fluid sample to carbon dioxide.

14. A system measuring the efficiency of a thermal catalytic combustion unit, the system comprises:

an apparatus comprising:

a thermal catalytic combustion unit, a drying unit fluidically connected to the thermal catalytic combustion unit and configured to be downstream of the thermal catalytic combustion unit, a sensor fluidically connected to the thermal catalytic combustion unit and configured to be downstream of the thermal catalytic combustion unit; wherein the sensor is configured to detect the presence of hydrocarbons and carbon monoxide in a formation fluid sample after the formation fluid sample was treated by the thermal catalytic combustion unit; wherein the sensor is located downstream of the drying unit; and an isotope ratio mass spectrophotometer fluidically connected to the drying unit and located downstream of the drying unit, and a gas chromatography unit fluidically connected to the thermal catalytic combustion unit and located upstream of the thermal catalytic combustion unit.

15. The system of claim 14, wherein the gas chromatography unit is configured to analyze the formation fluid sample to detect a hydrocarbon before the formation fluid sample is flowed to the thermal combustion unit.

16. The system of claim 14, wherein the isotope ratio mass spectrophotometer is configured to analyze the formation fluid sample to detect an isotope after the formation fluid sample was flowed to the thermal combustion unit.

17. The system of claim 14, wherein the thermal catalytic combustion unit is configured to use a catalyst to thermally degrade an alkane within a formation fluid sample to carbon dioxide.

18. The apparatus of claim 14, wherein the sensor is an infrared sensor or a solid state sensor.

19. The system of claim 14, wherein the sensor is a first sensor and a second sensor is disposed upstream of the thermal catalytic combustion unit.

20. The system of claim 19, wherein the second sensor is a same type of sensor as the first sensor.

\* \* \* \* \*